ns

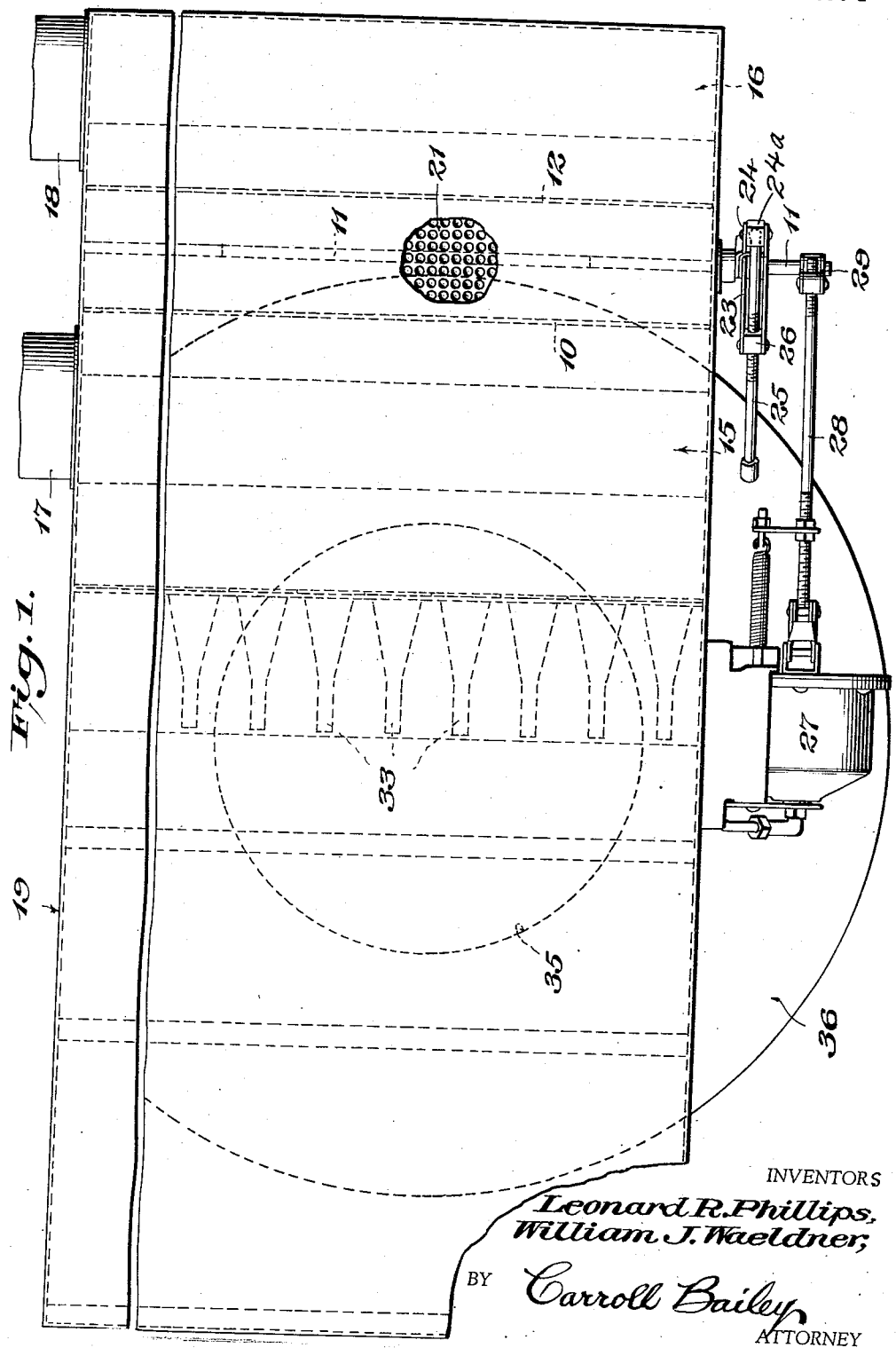

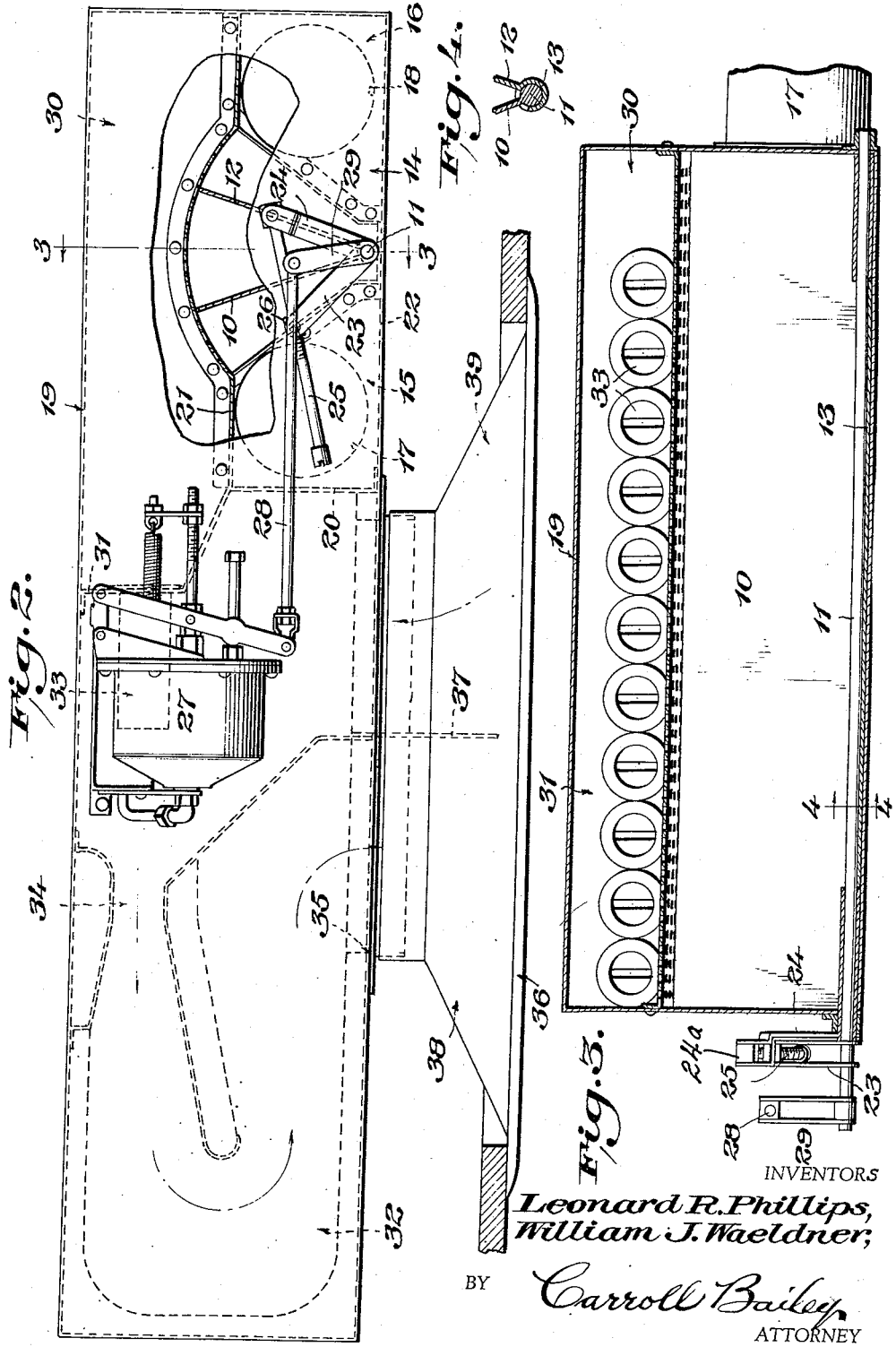

United States Patent Office 2,759,490
Patented Aug. 21, 1956

2,759,490
VALVE DEVICE

Leonard R. Phillips, East Hartford, and William J. Waeldner, Farmington, Conn., assignors to Anemostat Corporation of America, New York, N. Y., a corporation of Delaware Application November 24, 1952, Serial No. 322,264

2 Claims. (Cl. 137—607)

This invention relates to valve devices, and has particular reference to improvements in valve devices for regulating the total amount of fluid flowing from two different sources to a common outlet and for variably proportioning the amounts of the respective fluids.

The invention is of special utility in the ventilating art for regulating, for example, the supply in desired proportions of hot and cold air to air outlet devices. It may, however, be used for various other equivalent purposes.

Generally speaking, the object of the invention is to provide for a purpose such as mentioned, a simple, practical, readily adjustable valve device which is of comparatively low production, installation and maintenance cost and which effectively serves its purpose.

With the foregoing and other objects in view, the invention consists in a valve device embodying the novel features of construction, combination and arrangement of parts as are illustrated by way of example in the accompanying drawings and as will be hereinafter more fully described and claimed.

In the accompanying drawings, wherein like characters of reference denote corresponding parts in the different views:

Fig. 1 is a top plan view of a ventilating unit embodying a valve device constructed in accordance with the invention.

Fig. 2 is a side elevation of the unit shown in Fig. 1.

Fig. 3 is a cross section on the line 3—3 of Fig. 2; and

Fig. 4 is a detail cross section on the line 4—4 of Fig. 3.

In the drawings the invention is shown as embodied in an air outlet unit of a ventilating system. It is to be understood, however, that this is not to be construed as limiting, but as merely for the purpose of illustrating one practical use of the invention.

Essentially the present valve device comprises two plates swingably adjustable about a common axis and mounted in a casing between two separate compartments to which are supplied fluids from two different sources, means for adjusting said plates to and holding them in various different angular positions relative to each other, and means for swinging them as a unit and holding them in various different angular positions relative to an outlet through which they control fluid flow from the respective compartments.

According to the specific embodiment of the invention illustrated in the drawings, one of the valve plates, designated as 10, is fixed to and extends substantially radially from a shaft 11, while the other of said valve plates, designated as 12, is fixed to and extends substantially radially from a hollow shaft or a sleeve 13 which is engaged over and is rotatable relative to said shaft 11. Thus, the two valve plates are swingably adjustable relative to each other and also are swingably adjustable unitarily about a common axis.

The two valve plates 10 and 12 are disposed within a suitable casing 14 and serve to divide said casing into two separate compartments 15 and 16 with which are connected two separate ducts 17 and 18, respectively, for supplying fluids from two different sources to said compartments, respectively. The fluids may be hot and cold air, for example, and the casing 14 may be a part of the plenum chamber 19 of an air outlet device of a ventilating system as illustrated by way of example in the drawings. In other words, it is well known in the ventilating art to provide behind air outlet devices plenum chambers to which air is delivered from a source or sources of supply and from which the air flows to the air outlet devices, and the casing 14 may comprise part of such a plenum chamber. In this connection and according to the specific embodiment of the invention illustrated in the drawings, the casing 14 is provided in a lower end portion of the plenum chamber 19 by a generally vertical partition wall 20 and a generally horizontal partition wall 21 cooperating with each other and with portions of the bottom wall and an end wall of said plenum chamber.

The shaft 11 and the sleeve 13 are disposed adjacent to the bottom wall 22 of the casing 14 and between them and said bottom wall may be provided, if necessary or desirable, any suitable sealing means to prevent flow of fluid between the compartments 15 and 16. On the other hand, there may be provided in the top wall by said casing or, in other words, in the generally horizontal partition wall 21, a single wide opening of any suitable length constituting an outlet from the compartments 15 and 16 or, equivalently, a portion of said generally horizontal partition wall 21 may be perforated, as shown, to constitute an outlet from said compartments 15 and 16. In the latter event the said perforated portion of said partition wall 21 may be of arcuate shape and concentric relative to and suitably spaced from the shaft 11, as shown, so that the free edges of the plates 10 and 12 will, in all positions of adjustment of said plates, engage said wall and thus prevent flow of fluid between the compartments 15 and 16.

The invention includes means of any suitable form for swingably adjusting the plates 10 and 12 to increase or decrease the angle between them and to hold them in any angular relationship to each other to which they may be adjusted. One such means is illustrated in the drawings as comprising a lever arm 23 fixed to an end portion of the shaft 11 which extends exteriorly of the casing 14, a second lever arm 24 fixed to an end portion of the sleeve 13 which also extends exteriorly of the casing 14, and a threaded rod 25 which is suitably swiveled to a block 24ᵃ pivoted to one of said lever arms, the lever arm 24 for example, and is threaded through a block 26 pivoted to the other of said lever arms. Thus, by rotating said rod, the shaft 11 and the sleeve 13 may be rotated relative to each to swing the plates 10 and 12 toward or away from each other. Moreover, said rod, acting through the lever arms 23 and 24 and the shaft 11 and the sleeve 13, will serve to hold said plates 10 and 12 in any angular position relative to each other to which they may be adjusted.

The invention also includes means of any suitable form for effecting unitary swinging adjustments of the plates 10 and 12 when said plates are in any position of adjustment relative to each other. As illustrated by way of example in the drawings, this means may comprise a fluid pressure power device, designated generally as 27, which may be thermostatically controlled and which is connected by a rod 28 to a lever arm 29 which may be fixed to the shaft 11 or, if desired, to the sleeve 13. Alternatively, a manually operable means generally similar to the means connecting the lever arms 23 and 24 or of any other suitable type may be provided for unitarily adjusting the plates 10 and 12.

As will be apparent from the foregoing, the proportional amounts of air or other fluid flowing from the two compartments 15 and 16 through the outlet from the casing 14 may be varied by unitary angular adjustments of the plates 10 and 12, while the total amount of air or other fluid flowing from said compartments through said outlet may be varied by adjusting said plates toward and away from each other. Thus, the invention is complete as so far described whether the casing 14 is part of or separate from some other structure such as the plenum chamber 19.

According to the specific adaptation of the invention to an air outlet unit of a ventilating system, as shown in the drawings, there is a space 30 in the plenum chamber 19 above the outlet from the casing 14 into which air, under the control of the valve plates 10 and 12, flows from the compartments 15 and 16. A partition wall 31 separates the space 30 from the remaining space 32 in the plenum chamber 19, and mounted on said partition wall is a row of jet nozzles 33 through which air flows from the space 30 to the space 32. In the space 32, in alinement with the jet nozzles 33, is a Venturi passageway 34 through which air from the jet nozzles 33 passes whereby its velocity is accelerated. From the Venturi passageway 34 the air flows through an opening 35 in the bottom wall of the plenum chamber 19 to and through an air outlet device 36 of any suitable kind suitably connected with said opening 35. In this connection and as indicated in the drawings, the outlet device 36 may be divided by a partition wall 37 or in any other suitable manner, into two separate portions 38 and 39, one for discharge of air and the other for induction of air, and the induction portion 39 may be in communication with the inlet end of the Venturi passageway 34 whereby flow of air from the nozzles 33 through said passageway induces flow of air through said inlet portion 39 for admixture with the air flowing from the nozzles 33. This, however, is not essential since it is optional whether the outlet device 36 has an air induction portion connected with the inlet end of the Venturi passageway 34. In any event, the present valve device, as combined with an air outlet unit as shown, is effective to regulate not only the total amount, but also the proportional amounts of air flowing from the two ducts 17 and 18 to the outlet device 36, regardless of the form of said outlet device and regardless of whether there is or is not provision for acceleration of flow of the air.

From the foregoing description considered in connection with the accompanying drawings, it is believed that the construction and operation of the invention will be clearly understood and its advantages appreciated. It is desired to point out, however, that while only a single, specific embodiment of the invention has been illustrated and described, the same is readily capable of specifically different embodiments within its spirit and scope as defined in the appended claims.

We claim:

1. A valve device comprising a casing, a pair of swingably adjustable valve plates disposed in said casing in side to side relationship to each other and extending across said casing intermediate opposite sides thereof and dividing said casing into two separate compartments, means for supply of fluids from two different sources to said compartments, respectively, said casing having an outlet common to both of said compartments, a rotatable shaft element to which one of said plates is secured along one edge thereof for swinging adjustments, a sleeve element rotatably mounted on said shaft element and to which the other of said plates is secured along one edge thereof for swinging adjustments, said plates having their opposite edges free and disposed adjacent to said common outlet whereby swinging movements of said plates relative to each other is effective to vary the total volume of fluids flowing from both of said compartments through said common outlet and unitary swinging movements of said plates is effective to vary the proportionate amounts of the fluids flowing from the respective compartments through said common outlet without varying the total volume of the fluids flowing from both of said compartments, a lever arm fixed to said shaft element, a lever arm fixed to said sleeve element, screw elements connected to each other and connecting said lever arms together to swingably adjust said valve plates relative to each other to vary the total volume of the fluids flowing from both of said compartments through said common outlet, said lever arms and said screw elements being effective to hold said valve plates in any position of swingable adjustment relative to each other, and means separate from said lever arms and said screw elements operatively connected to one of said valve plates for swingably adjusting the same and thereby effecting unitary swinging adjustments of said valve plates in any positon of adjustment of both of said plates relative to each other to vary the proportionate amounts of the fluids flowing from the respective compartments through said common outlet without varying the total volume of the fluids flowing from said compartments through said outlet.

2. A valve device comprising a casing, a pair of swingably adjustable valve plates disposed in said casing in side to side relationship to each other and extending across said casing intermediate opposite sides thereof and dividing said casing into two separate compartments, means for supply of fluids from two different sources to said compartments, respectively, said casing having an outlet common to both of said compartments, a rotatable shaft element to which one of said plates is secured along one edge thereof for swinging adjustments, a sleeve element rotatably mounted on said shaft element and to which the other of said plates is secured along one edge thereof for swinging adjustments, said plates having their opposite edges free and disposed adjacent to said common outlet whereby swinging movements of said plates relative to each other is effective to vary the total volume of fluids flowing from both of said compartments through said common outlet and unitary swinging movements of said plates is effective to vary the proportionate amounts of the fluids flowing from the respective compartments through said common outlet without varying the total volume of the fluids flowing from both of said compartments, means connecting said shaft and sleeve elements together and effective to rotate them relative to each other to swingably adjust said valve plates relative to each other to vary the total volume of the fluids flowing from both of said compartments through said common outlet, said connecting means being effective to hold said elements in any position of rotative adjustment relative to each other and thereby to hold said valve plates in any position of swingable adjustment relative to each other, and means separate from said connecting means connected to one of said elements for rotatably adjusting the same and thereby effecting unitary swinging adjustments of said valve plates in any position of adjustment of said plates relative to each other to vary the proportionate amounts of the fluids flowing from the respective compartments through said common outlet without varying the total volume of the fluids flowing from said compartments through said outlet.

References Cited in the file of this patent

UNITED STATES PATENTS

| | | |
|---|---|---|
| 440,229 | Keith | Nov. 11, 1890 |
| 699,352 | Titus | May 6, 1902 |
| 1,125,503 | Fleck | Jan. 19, 1915 |
| 1,568,410 | Minter | Jan. 5, 1926 |
| 1,783,005 | Stewart | Nov. 25, 1930 |
| 2,246,338 | Ashley | June 17, 1941 |
| 2,505,996 | Simpelaar | May 2, 1950 |
| 2,620,983 | Lyman | Dec. 9, 1950 |

FOREIGN PATENTS

| | | |
|---|---|---|
| 423,670 | Germany | Jan. 9, 1926 |
| 297,955 | Italy | June 24, 1932 |